(12) United States Patent
John et al.

(10) Patent No.: US 11,591,095 B2
(45) Date of Patent: Feb. 28, 2023

(54) PRESSURE RELIEF VALVE WITH DEFLECTING DISKS FOR INFLATABLE

(71) Applicant: Goodrich Corporation, Charlotte, NC (US)

(72) Inventors: Poly Puthur John, Trivandrum (IN); Shyamkumar Dattatri, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 136 days.

(21) Appl. No.: 16/983,678

(22) Filed: Aug. 3, 2020

(65) Prior Publication Data

US 2021/0291994 A1 Sep. 23, 2021

(30) Foreign Application Priority Data

Mar. 20, 2020 (IN) .............................. 202041012146

(51) Int. Cl.
*B64D 25/14* (2006.01)
*F16K 17/04* (2006.01)
*F16K 17/00* (2006.01)
*F16K 15/20* (2006.01)

(52) U.S. Cl.
CPC ............ *B64D 25/14* (2013.01); *F16K 15/207* (2013.01); *F16K 17/003* (2013.01); *F16K 17/0413* (2013.01)

(58) Field of Classification Search
CPC .... F16K 15/1441; F16K 15/145; F16K 17/04; F16K 17/0493; F16K 1/38; F16K 15/142; B64D 25/14
See application file for complete search history.

(56) References Cited

U.S. PATENT DOCUMENTS

| | | | | |
|---|---|---|---|---|
| 4,350,176 A | * | 9/1982 | Lace | F16K 17/10 137/554 |
| 4,368,009 A | * | 1/1983 | Heimovics, Jr. | B61B 12/005 417/179 |
| 4,919,167 A | * | 4/1990 | Manska | F16K 15/141 137/853 |
| 5,564,467 A | * | 10/1996 | Ackroyd | F16K 17/0493 137/535 |
| 5,765,298 A | | 6/1998 | Potter et al. | |
| 6,240,951 B1 | * | 6/2001 | Yori | F16K 15/207 137/224 |
| 6,302,138 B1 | | 10/2001 | Sumrall | |
| 8,584,700 B2 | * | 11/2013 | Vicars | F16K 15/063 137/516.29 |
| 2016/0061341 A1 | * | 3/2016 | Broschka | F16K 17/04 137/12 |
| 2017/0016459 A1 | * | 1/2017 | Ruegsegger | F04F 5/48 |
| 2017/0203849 A1 | * | 7/2017 | John | B64D 25/14 |
| 2018/0141669 A1 | * | 5/2018 | Ruegsegger | F04F 5/16 |

FOREIGN PATENT DOCUMENTS

GB 696333 8/1953

* cited by examiner

*Primary Examiner* — Kevin F Murphy
(74) *Attorney, Agent, or Firm* — Snell & Wilmer L.L.P.

(57) ABSTRACT

A pressure relief valve may comprise a housing, a disk, and a seal. The disk may be configured to deflect relative to the housing. The seal may form a sealing interface with at least one of the housing or disk. The pressure relief valve may be coupled to an inflatable slide or an aspirator.

13 Claims, 9 Drawing Sheets

PRESSURE RELIEF VALVE WITH DEFLECTING DISKS FOR INFLATABLE

CROSS REFERENCE TO RELATED APPLICATIONS

This application claims priority to and the benefit of India Patent Application No. 202041012146 filed on Mar. 20, 2020 and entitled "PRESSURE RELIEF VALVE WITH DEFLECTING DISKS FOR INFLATABLE," which is hereby incorporated by reference in its entirety for all purposes.

FIELD

The present disclosure relates to pressure relief valves and, in particular, to a pressure relief valve having a deflecting disk.

BACKGROUND

An emergency evacuation assembly may be used to exit an aircraft absent a jet way or other suitable means of egress for passengers. The evacuation assembly may include an inflatable slide. Current inflatable slides may include one or more pressure relief valves, configured to vent excess gas from the slide should the slide inflate to an overpressure condition. The pressure relief valves are located generally within the inflatable volume which tends to make the pressure relief valves difficult to repair. Further, the pressure relief valves may create hard spots along the slide, as the pressure relief valves are generally made from a rigid material. The hard spots and portions of the pressure relief valve located within the internal volume of the slide may also make the slide difficult to fold and pack.

SUMMARY

A pressure relief valve is disclosed herein. In accordance with various embodiments, the pressure relief valve may comprise a housing, a disk, and a seal. The disk may be configured to deflect relative to the housing. The seal may be configured to form a sealing interface with at least one of the housing or the disk.

In various embodiments, the pressure relief valve may further comprise a conduit. The housing and the disk may be mounted to the conduit. In various embodiments, the housing, the disk, the seal, and an outer circumferential surface of the conduit may define a cavity. An orifice defined by the conduit may fluidly connect an interior of the conduit and the cavity. In various embodiments, the disk may be configured to deflect away from the housing in response to a pressure within the cavity exceeding a preselected threshold pressure.

In various embodiments, a biasing member may be configured to apply a biasing force against the disk. The seal may be located in a seal cavity defined by the housing. The biasing member may be configured to bias an interface surface of the disk toward the seal.

In various embodiments, the biasing member may comprise a torsion spring. In various embodiments, the interface surface of the disk may include a seal seat. The seal seat may protrude from the interface surface of the disk toward the seal.

In various embodiments, a biasing member may be configured to apply a biasing force against the disk, and the seal may be coupled to the disk. The biasing member may be configured to bias the disk and the seal toward an interface surface of the housing.

An evacuation assembly is also disclosed herein. In accordance with various embodiments, the evacuation assembly may comprise an inflatable slide, an aspirator fluidly coupled to the inflatable slide, and a pressure relief valve coupled to at least one of the inflatable slide or the aspirator. The pressure relief valve may include a housing, a disk configured to deflect relative to the housing, and a seal configured to form a sealing interface with at least one of the housing or the disk. The housing, the disk, and the seal may define a cavity. The disk may be configured to deflect away from the housing in response to a pressure within the cavity exceeding a preselected threshold pressure.

In various embodiments, the pressure relief valve may further comprise a conduit fluidly coupled to the inflatable slide. The housing and the disk may be mounted to the conduit. In various embodiments, the conduit may be configured as a closed conduit. In various embodiments, a plug may be removably coupled to the conduit. An end of the conduit may form an inflation-deflation port in response to removal of the plug.

In various embodiments, a biasing member may be configured to bias the disk toward the housing. In various embodiments, the biasing member may comprise a torsion spring.

In various embodiments, the seal may be located in a seal cavity defined by the housing, and the biasing member may be configured to bias an interface surface of the disk toward the seal.

An aspirator for an inflatable assembly is also disclosed herein. In accordance with various embodiments, the aspirator may comprise an aspirator housing, an inlet flap configured to pivot relative to the aspirator housing, and a manifold located in an interior of the aspirator housing and configured to output a primary gas flow toward an outlet of the aspirator housing. A nozzle may be fluidly coupled to the manifold. The nozzle may be configured to output the primary gas flow to the manifold. A pressure relief valve may be coupled to the aspirator housing. The pressure relief valve may include a housing, a disk configured to deflect relative to the housing, and a seal configured to form a sealing interface with at least one of the housing or the disk.

In various embodiments, the housing, the disk, the seal, and an outer circumferential surface of the aspirator housing may define a cavity. An orifice defined by the aspirator housing may fluidly connect the cavity and the interior of the aspirator housing. The disk may be configured to deflect away from the housing in response to a pressure within the cavity exceeding a preselected threshold pressure.

In various embodiments, a biasing member may be configured to apply a biasing force against the disk. In various embodiments, the seal may be located in a seal cavity defined by the housing, and the biasing member may be configured to bias an interface surface of the disk toward the seal.

In various embodiments, the seal may be coupled to the disk, and the biasing member may be configured to bias the disk and the seal toward an interface surface of the housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Surface cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

In the context of the present disclosure, the pressure relief valves disclosed herein may find particular use in connection with inflatable evacuation slides and aspirators of aircraft evacuation systems. However, various aspects of the disclosed pressure relief valves may be adapted for performance in a variety of other inflatable assemblies, for example, inflatable raft assemblies. As such, numerous applications of the present disclosure may be realized.

Figure 1:
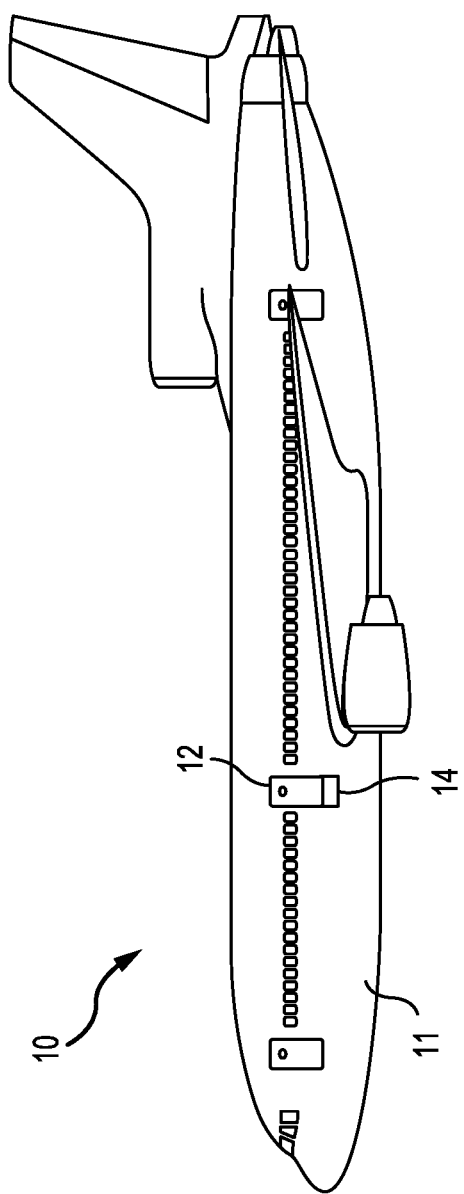
FIG. 1 illustrates an aircraft having an evacuation assembly, in accordance with various embodiments.

Referring now to FIG. 1, an aircraft 10 is shown. Aircraft 10 may include a fuselage 11 having plurality of exit doors, including an exit door 12. Aircraft 10 may include one or more evacuation assemblies positioned near a corresponding exit door. For example, aircraft 10 includes an evacuation assembly 14 positioned near exit door 12. In the event of an emergency, exit door 12 may be opened by a passenger or crew member of aircraft 10. In various embodiments, evacuation assembly 14 may deploy in response to exit door 12 being opened or in response to another action taken by a passenger or crew member such as depression of a button or actuation of a lever.

Figure 2:
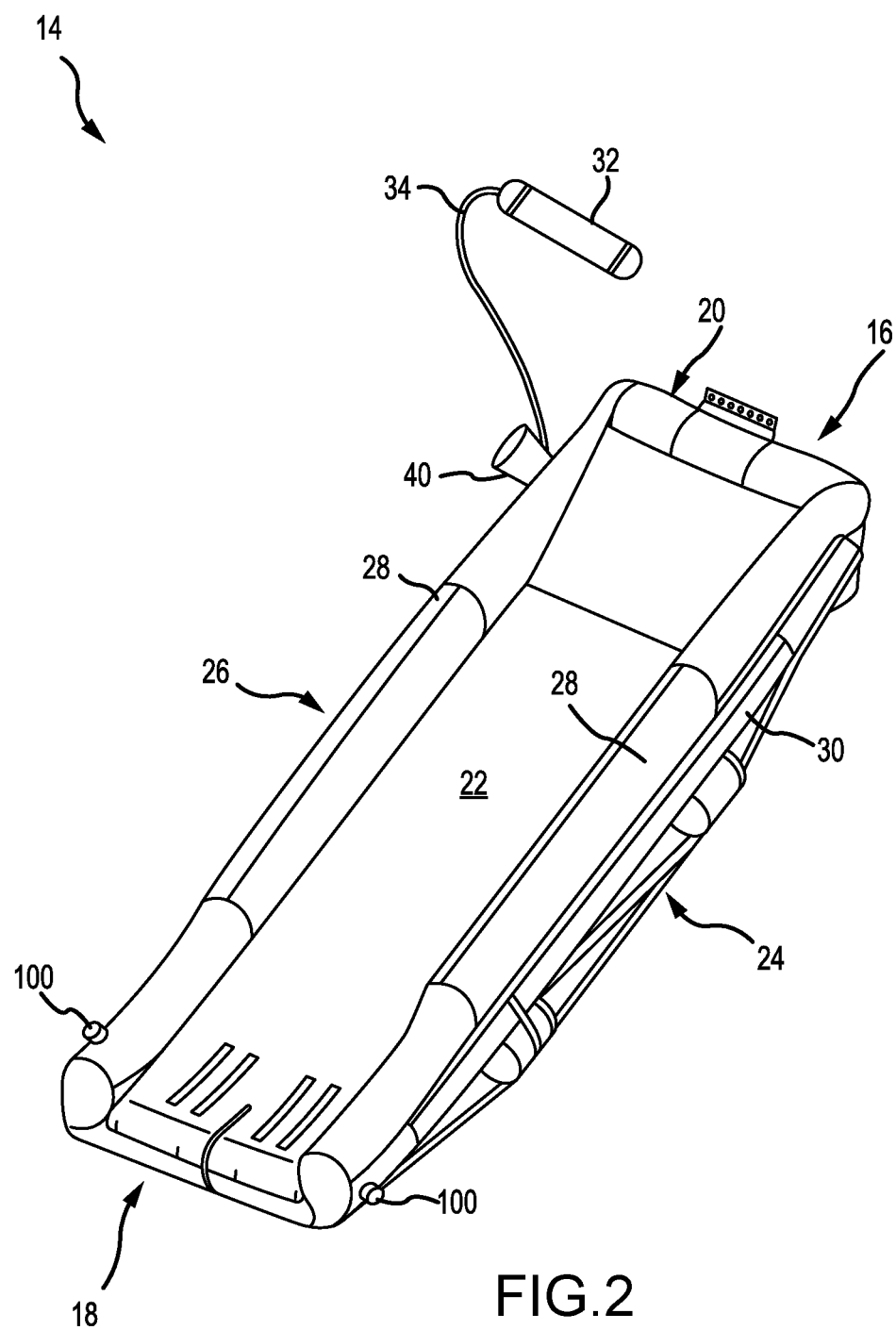
FIG. 2 illustrates a perspective view of an evacuation slide in a deployed position, in accordance with various embodiments.

With reference to FIG. 2, evacuation assembly 14 is illustrated with an evacuation slide 16 of evacuation assembly 14 in an inflated or "deployed" position. In accordance with various embodiments, evacuation slide 16 includes a toe end 18 and a head end 20 opposite toe end 18. Head end 20 may be coupled to an aircraft structure (e.g., fuselage 11 in FIG. 1). In various embodiments, evacuation slide 16 is an inflatable slide. Evacuation slide 16 includes a sliding surface 22 and an underside surface 24 opposite sliding surface 22. Sliding surface 22 extends from head end 20 to toe end 18. During an evacuation event, underside surface 24 may be oriented toward an exit surface (e.g., toward the ground or toward a body of water). Evacuation slide 16 is illustrated as a single lane slide. However, evacuation slide 16 may comprise any number of lanes.

Evacuation slide 16 may comprise an inflatable rail structure 26. Inflatable rail structure 26 includes a first (or upper) inflatable tube 28. In various embodiments, inflatable rail structure 26 may include a second (or lower) inflatable tube 30. First inflatable tube 28 and second inflatable tube 30 may extend between head end 20 and toe end 18. Upon deployment of evacuation slide 16, first inflatable tube 28 may be located generally over or above second inflatable tube 30, such that second inflatable tube 30 is located generally between first inflatable tube 28 and the exit surface.

Evacuation assembly 14 may include a compressed fluid source, or charge cylinder, 32. Compressed fluid source 32 is configured to deliver a pressurized gas to inflate evacuation slide 16. Compressed fluid source 32 may be fluidly coupled to evacuation slide 16. For example, compressed fluid source 32 may be fluidly coupled to inflatable rail structure 26. In various embodiments, compressed fluid source 32 may be fluidly coupled to evacuation slide 16 via a hose, or conduit, 34. In response to receiving the gas from compressed fluid source 32, evacuation slide 16 begins to inflate.

In various embodiments, evacuation assembly 14 may include one or more aspirator(s) 40 fluidly coupled between compressed fluid source 32 and evacuation slide 16. In various embodiments, first inflatable tube 28 and second inflatable tube 30 may each have a dedicated aspirator 40, such that a first aspirator is attached, or coupled, to first inflatable tube 28 and a second aspirator is attached, or coupled, to second inflatable tube 30. Aspirator 40 may be configured to entrain ambient air with gas output from compressed fluid source 32 (referred to herein as primary gas). For example, in response to deployment of evacuation slide 16, primary gas from compressed fluid source 32 may flow into aspirator 40. This primary gas flow may cause aspirator 40 to draw in a secondary gas (i.e., ambient air)

from the environment. The primary gas flow and the secondary gas may be directed into inflatable rail structure 26. In response to receiving the primary gas and the environmental gas, evacuation slide 16 begins to inflate.

In accordance with various embodiments, one or more pressure relief valve(s) (PRV) 100 may be fluidly coupled to first inflatable tube 28 and/or to second inflatable tube 30 of inflatable rail structure 26. As described in further detail below, PRV 100 may be configured to translate to an open position in response to an internal pressure of evacuation slide 16 (i.e., a pressure within inflatable rail structure 26) exceeding a preselected threshold pressure. In accordance with various embodiments, when PRV 100 is in the open position, fluid from the internal volume of evacuation slide 16 may flow out PRV 100, thereby decreasing the internal pressure of evacuation slide 16.

Figure 3A:
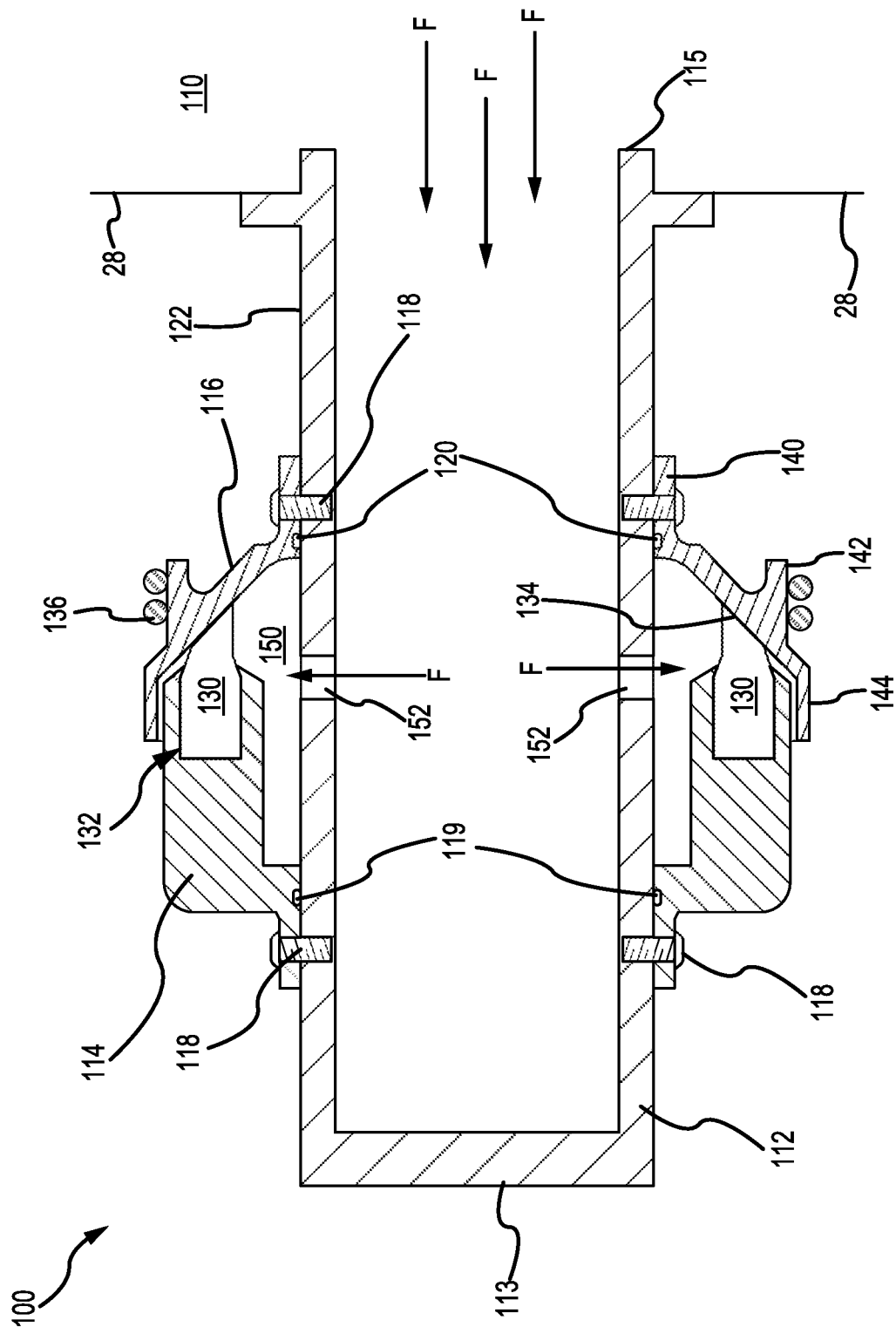
FIGS. 3A and 3B illustrate a cross-section view of a pressure relief valve having a deflecting disk in a closed position and an open position, respectively, in accordance with various embodiments.
Figure 3B:
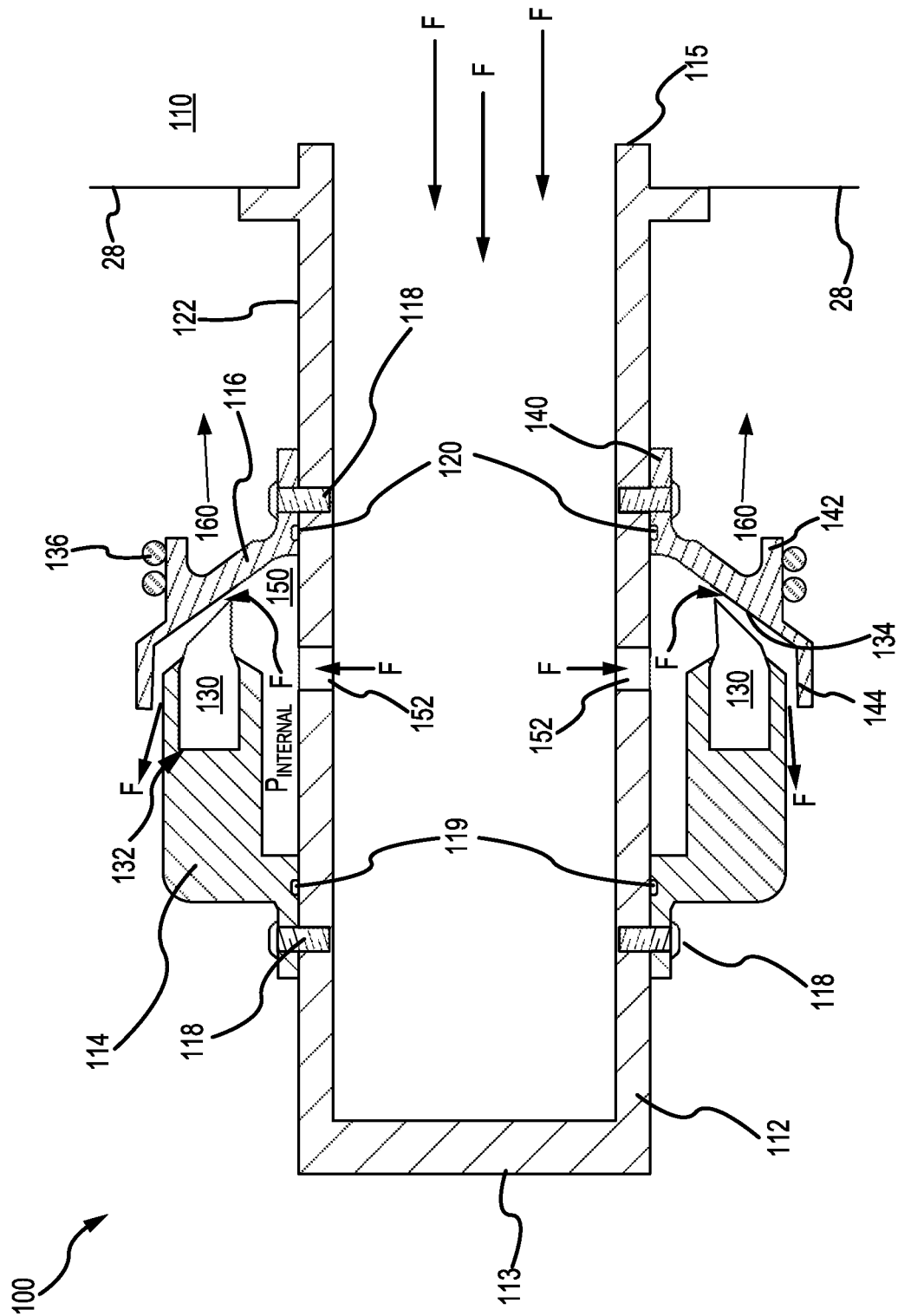

With reference to FIG. 3A, a cross section view of a PRV 100 attached to first inflatable tube 28 of evacuation slide 16 is illustrated. FIG. 3A illustrates PRV 100 in the closed position. PRV 100 includes a housing 114 and a disk 116. Housing 114 may be an annular, generally cylindrically-shaped structure. Disk 116 may be an annular, generally conically-shaped structure. Housing 114 may be made of metal, metal alloy, plastic, composite, or any suitably rigid material. Disk 116 may be metal, metal alloy, plastic, composite, or any other material, which allows disk to deflect (i.e., bend) between a closed position (FIG. 3A) and an open position (FIG. 3B).

In various embodiments, PRV 100 may include a conduit, or tube, 112 fluidly coupled to first inflatable tube 28. Housing 114 and disk 116 may be mounted to conduit 112 via one or more fasteners 118. In various embodiments, conduit 112 is configured as closed conduit. In this regard, an end 113 of conduit 112 is closed. End 113 may be opposite an inlet end 115 of conduit 112. Inlet end 115 of conduit 112 may be located at or within an internal volume 110 defined by first inflatable tube 28.

In various embodiments, a housing O-ring seal 119 may be located between housing 114 and an outer circumferential surface 122 of conduit 112. A disk O-ring seal 120 may be located between disk 116 and outer circumferential surface 122 of conduit 112. Housing 114 and disk 116 are located external to (i.e., outside of) first inflatable tube 28. In this regard, housing 114 and disk 116 may be located on conduit 112 opposite internal volume 110 of first inflatable tube 28.

PRV 100 includes a seal 130. In accordance with various embodiments, seal 130 may be located in a seal cavity 132 defined by housing 114. Seal 130 forms a sealing interface with an interface surface 134 of disk 116. Seal 130 may be formed of a compressible material, for example, rubber, polytetrafluoroethylene (PTFE), fluorosilicone, polyurethane, or any desired elastomer or polymeric material. In various embodiments, PRV 100 includes a biasing member 136. Biasing member 136 is configured to apply a force to disk 116. The force applied by biasing member 136 forces interface surface 134 of disk 116 toward seal 130. Biasing member 136 may comprise a torsion spring, compression spring, or any biasing member. In various embodiments, disk 116 may include a first flange, or collar, 140 located on conduit 112 and configured to support fasteners 118. In this regard, fasteners 118 may secure first flange 140 to conduit 112. In various embodiments, disk 116 may include a second flange, or collar, 142 configured to support biasing member 136. Second flange 142 is generally radially outward of first flange 140. In this regard, a diameter of disk 116 at second flange 142 is greater than a diameter of disk 116 at first flange 140. As used herein, "radial" refers to directions perpendicular to outer circumferential surface 122 of conduit 112. A first component that is radially outward of a second component means that the first component is located a greater distance from outer circumferential surface 122 as compared to the second component. In various embodiments, disk 116 may include a third flange, or collar, 144. Third flange 144 may be located directly over housing 114, such that third flange 144 overlaps housing 114 in the radially outward direction. When PRV 100 is in the open position, as described below, third flange 144 may direct the flow F of fluid exiting PRV 100 away from interface surface 134 and/or away from first inflatable tube 28.

In accordance with various embodiments, housing 114, disk 116, seal 130, and outer circumferential surface 122 of conduit 112 define a cavity 150. Cavity 150 receives fluid from conduit 112 via orifices 152 formed in (i.e., defined by) conduit 112. During inflation of first inflatable tube 28, fluid F may flow from internal volume 110 of first inflatable tube 28 into conduit 112 via inlet end 115 of conduit 112, and from conduit 112 into cavity 150 via orifices 152.

With reference to FIG. 3B, a cross section view of a PRV 100 in an open position is illustrated. In accordance with various embodiments, disk 116 is configured to deflect away from seal 130 and housing 114 (i.e., in the direction of arrow 160), in response to an internal pressure ($P_{INTERNAL}$) within cavity 150 exceeding a preselected threshold pressure. Stated differently, interface surface 134 translates away from seal 130, thereby translating PRV 100 to an open position, in response to the internal pressure ($P_{INTERNAL}$) within cavity 150 exceeding the preselected threshold pressure. In accordance with various embodiments, $P_{INTERNAL}$ correlates to the internal pressure of evacuation slide 16. In this regard, an increase in the pressure of evacuation slide 16 increases $P_{INTERNAL}$. In accordance with various embodiments, disk 116 and biasing member 136 are configured such that when $P_{INTERNAL}$ exceeds the preselected threshold pressure, the biasing force applied by biasing member 136 to disk 116 is overcome, thereby allowing disk 116 to deflect such that a space is created between seal 130 and interface surface 134. In the open position, fluid F may flow between seal 130 and interface surface 134 and out PRV 100, thereby decreasing the internal pressure of evacuation slide 16. $P_{INTERNAL}$ continues to decrease until the force applied by biasing member 136 exceeds $P_{INTERNAL}$. Once the force applied by biasing member 136 exceeds $P_{INTERNAL}$, PRV 100 will translate to closed position, wherein interface surface 134 forms a sealing interface with seal 130. In various embodiments, seal 130 and disk 116 are configured such that when disk 116 is in a neutral (i.e., non-defected) position, interface surface 134 contacts seal 130. In various embodiments, seal 130 and disk 116 are configured such that, when disk 116 is in the neutral (i.e., non-defected) position, interface surface 134 compresses seal 130.

PRV 100 employs deflection of disk 116 to translate between the open and closed positions. Using deflection, as opposed to a sliding movement employed by conventional seals, tends to reduce or eliminate pressure induced noise or chattering. PRV 100 being located external to first inflatable tube 28 provides easy access to the components of PRV 100 should they need to be repaired or replaced and also reduces or eliminates hard spots within the slide which tends to allow for easier folding and packing of the evacuation slide.

Figure 4:
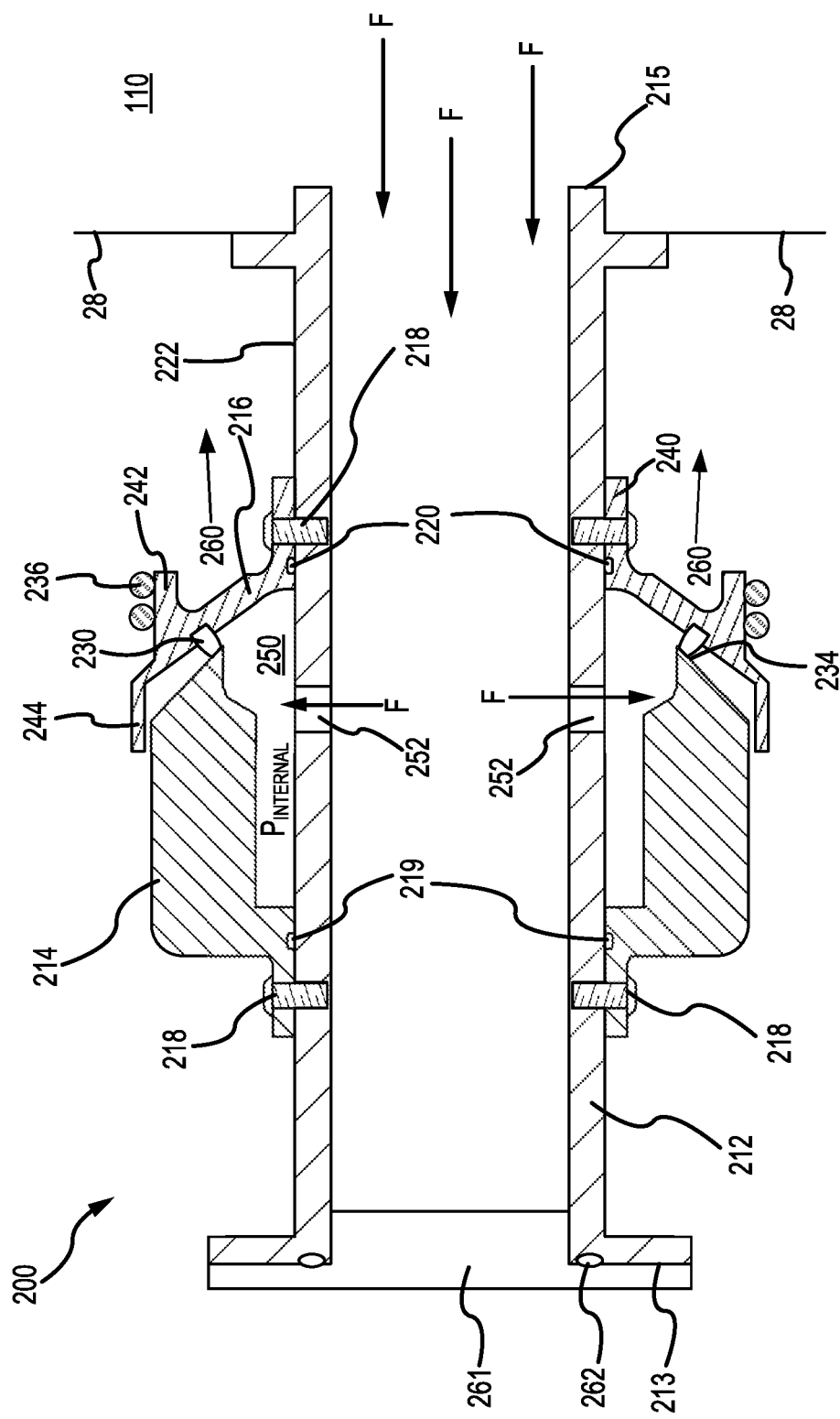
FIG. 4 illustrates a cross section view of a pressure relief valve having a deflecting disk in a closed position, in accordance with various embodiments.

With reference to FIG. 4, a cross section view of a PRV 200 attached to first inflatable tube 28 of evacuation slide 16 is illustrated. FIG. 4 illustrates PRV 200 in the closed position. PRV 200 includes a housing 214 and a disk 216, similar to housing 114 and disk 116, respectively, of PRV 100 in FIGS. 3A and 3B. As described in further detail below, disk 216 is configured to deflect away from housing 214 in response to an internal pressure of evacuation slide 16 exceeding a preselected threshold pressure.

In various embodiments, PRV 200 may include a conduit, or tube, 212 fluidly coupled to first inflatable tube 28. Housing 214 and disk 216 may be mounted to conduit 212 via one or more fasteners 218. In various embodiments, conduit 212 is configured as an open conduit. In this regard, an end 213 of is open. End 213 may be opposite an inlet end 215 of conduit 212. Inlet end 215 of conduit 212 may be located at or within the internal volume 110 defined by first inflatable tube 28. In various embodiments, a plug, or cap, 261 may be removably attached to end 213 of conduit 212. A plug O-ring seal 262 may be located between conduit 212 and plug 261. When plug 261 is removed from end 213, conduit 212 may be employed as an inflation-deflation port. In this regard, plug 261 may be removed and first inflatable tube 28 can be inflated or deflated via fluid flowing through end 213 of the conduit 212.

In various embodiments, a housing O-ring seal 219 may be located between housing 214 and an outer circumferential surface 222 of conduit 212. A disk O-ring seal 220 may be located between disk 216 and outer circumferential surface 222 of conduit 212. Housing 214 and disk 216 are located external to first inflatable tube 28.

PRV 200 includes a seal 230. In accordance with various embodiments, seal 230 may be attached to disk 216. Seal 230 forms a sealing interface with an interface surface 234 of housing 114. Seal 230 may be formed of a compressible material, for example, rubber, PTFE, fluorosilicone, polyurethane, or any desired elastomer or polymeric material. In various embodiments, PRV 200 includes a biasing member 236. Biasing member 236 is configured to apply a force to disk 216. The force applied by biasing member 236 forces disk 216 and seal 230 toward interface surface 234 of housing 214. Biasing member 236 may comprise a torsion spring, compression spring, or any biasing member. In various embodiments, disk 216 may include a first flange, or collar, 240 located on conduit 212 and configured to support fasteners 218. In various embodiments, disk 216 may include a second flange, or collar, 242 configured to support biasing member 236. Second flange 242 is generally radially outward of first flange 240. In this regard, a diameter disk 216 as measured at second flange 242 is greater than a diameter of disk 216 as measured at first flange 240. As used herein, "radial" refers to directions perpendicular to outer circumferential surface 222 of conduit 212. A first component that is radially outward of a second component means that the first component is located a greater distance from outer circumferential surface 222 as compared to the second component. In various embodiments, disk 216 may include a third flange, or collar, 244. Third flange 244 may be located directly over housing 214, such that third flange 244 overlaps housing 214 in the radially outward direction. When PRV 200 is in the open position, third flange 244 may direct the flow of fluid F exiting PRV 200 away from first inflatable tube 28.

In accordance with various embodiments, housing 214, disk 216, seal 230, and outer circumferential surface 222 of conduit 212 define a cavity 250. Cavity 250 receives fluid F from conduit 212 via orifices 252 formed in (i.e., defined by) conduit 212. During inflation of first inflatable tube 28, fluid F may flow from internal volume 110 of first inflatable tube 28 into conduit 212 via inlet end 215 of conduit 212, and from conduit 212 into cavity 250 via orifices 252.

In accordance with various embodiments, disk 216 is configured to deflect in the direction of arrow 260 and to an open position, in response to an internal pressure ($P_{INTERNAL}$) within cavity 250 exceeding a preselected threshold pressure. In this regard, disk 216 and seal 230 translate away from interface surface 234 of housing 214, in response to the internal pressure ($P_{INTERNAL}$) within cavity 250 exceeding the preselected threshold pressure. In accordance with various embodiments, $P_{INTERNAL}$ correlates to the internal pressure of evacuation slide 16. An increase in the pressure of evacuation slide 16 increases $P_{INTERNAL}$. In accordance with various embodiments, disk 216 and biasing member 236 are configured such that when $P_{INTERNAL}$ exceeds the preselected threshold pressure, the biasing force applied by biasing member 236 to disk 216 is overcome, thereby allowing disk 216 to deflect such that a space is created between seal 230 and interface surface 234. In the open position, fluid F may flow between seal 230 and interface surface 234 and out PRV 200, thereby decreasing the internal pressure of evacuation slide 16.

When PRV 200 is the open position, $P_{INTERNAL}$ continues to decrease until the force applied by biasing member 236 exceeds $P_{INTERNAL}$. Once the force applied by biasing member 236 exceeds $P_{INTERNAL}$, PRV 200 translates to closed position, wherein interface surface 234 forms a sealing interface with seal 230. In various embodiments, seal 230 and disk 216 are configured such that when disk 216 is in a neutral (i.e., non-defected) position, seal 230 contacts interface surface 234. In various embodiments, seal 230 and disk 216 are configured such that, when disk 216 is in a neutral (i.e., non-defected) position, seal 230 is compressed against interface surface 234.

PRV 200 employs deflection of disk 216 to translate between the open and closed positions. Using deflection, as opposed to the sliding movement employed by conventional seals, tends to reduce or eliminate pressure induced noise or chattering. PRV 200 being located external to first inflatable tube 28 provides easy access to the components of PRV 200 should they need to be repaired or replaced and also reduces or eliminates hard spots within the slide which tend to allow for easier folding and packing of the evacuation slide.

Figure 5A:
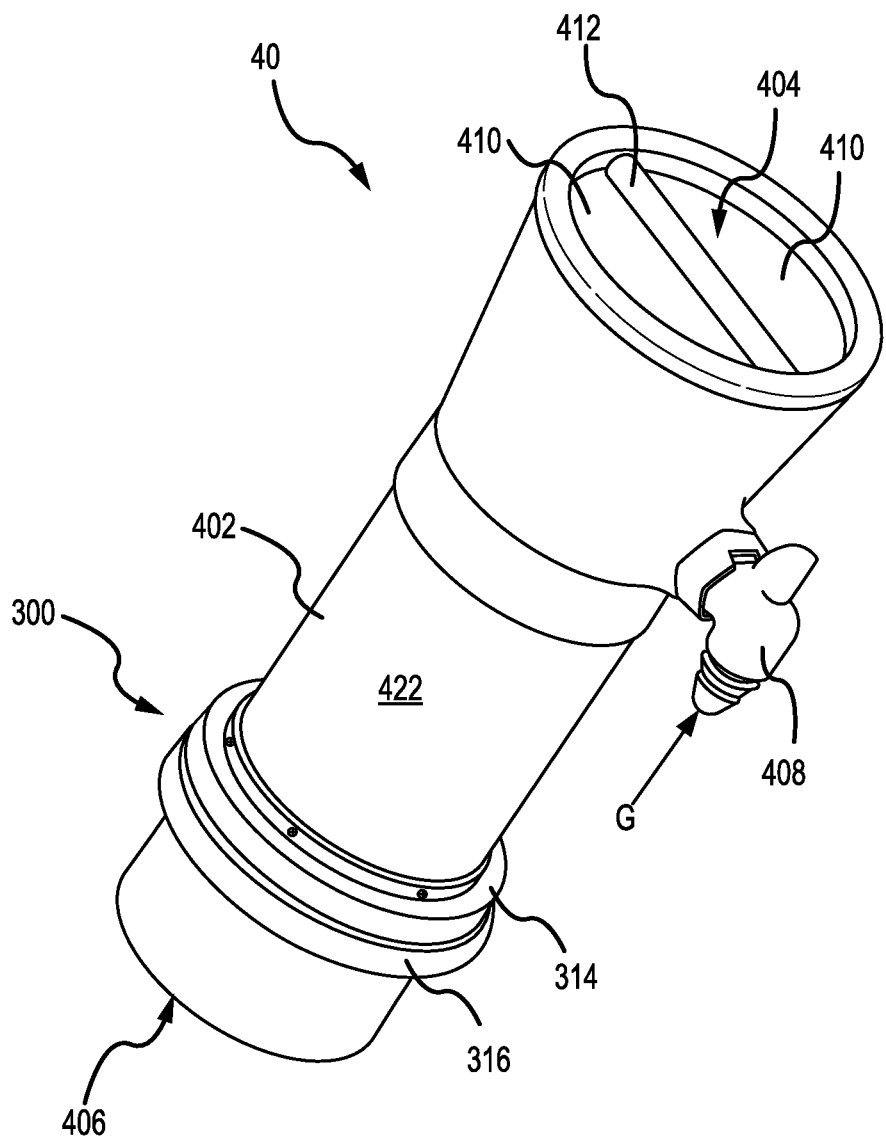
FIGS. 5A and 5B illustrate a perspective view and a cross-section view, respectively, of an aspirator with a pressure relief valve having a deflecting disk, in accordance with various embodiments.

With reference to FIG. 5A, a perspective view of aspirator 40 including a PRV 300 is illustrated. Aspirator 40 includes an aspirator housing 402. Aspirator housing 402 may define an aspirator inlet 404 and an aspirator outlet 406 of aspirator 400. Aspirator 400 may further include a nozzle 408. Nozzle 408 is configured to fluidly couple to conduit 34 of compressed fluid source 32 (with momentary reference to FIG. 2). In this regard, the primary gas G from compressed fluid source 32 may be provided to aspirator 40 via nozzle 408.

In accordance with various embodiments, aspirator 40 further includes one or more inlet flaps 410. In FIG. 5A, inlet flaps are in the closed position. Inlet flaps 410 are located proximate aspirator inlet 404. Inlet flaps 410 are configured to pivot relative to aspirator housing 402. For example, in various embodiments, inlet flaps 410 may be pivotably coupled to a cross strut 412 of aspirator 40. Cross strut 412 may span a diameter of aspirator housing 402. In this regard, cross strut 412 may be coupled to opposing sides of aspirator housing 402.

PRV 300 may be mounted to aspirator housing 402. For example, a housing 314 including a seal 330, described in greater detail with reference to FIGS. 6A & 6B, and a disk 316 of PRV 300 may be located around an outer circumferential surface 422 of aspirator housing 402. Housing 314 may be an annular, generally cylindrically-shaped structure. Disk 316 may be an annular, generally conically-shaped structure. Housing 314 may be made of metal, metal alloy, plastic, composite, or any suitably rigid material. Disk 316 may be metal, metal alloy, plastic, composite, or any other material, which allows disk 316 to deflect (i.e., bend) between a closed position (FIG. 6A) and an open position (FIG. 6B).

Figure 5B:
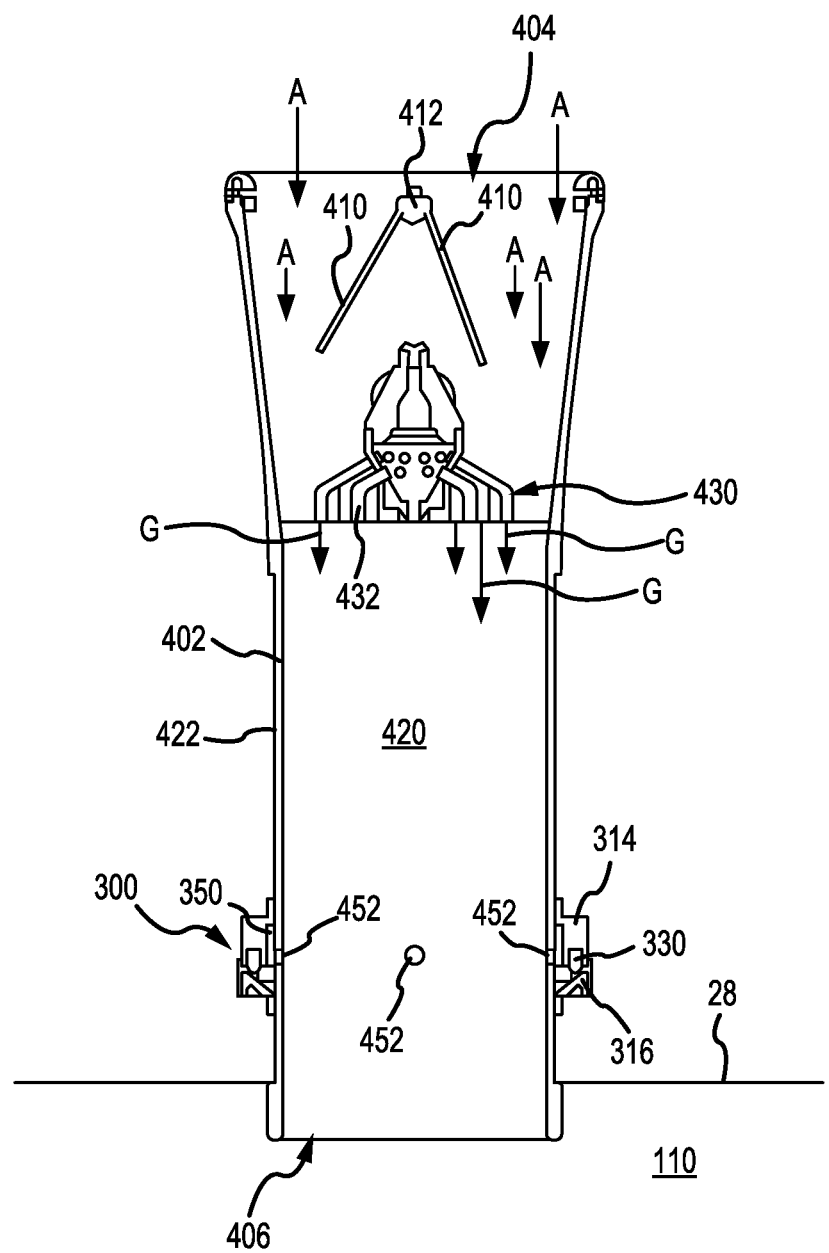

With reference to FIG. 5B, a cross-section view of aspirator 40 with inlet flaps 410 in the open position is illustrated. In accordance with various embodiments, aspirator housing 402 may define an interior volume 420 of aspirator 40. In various embodiments, aspirator 40 may include a manifold 430 located in interior volume 420. Nozzle 408 (FIG. 5A) is fluidly coupled to manifold 430 and may output the primary gas flow received from compressed fluid source 32 (FIG. 2) to manifold 430. Manifold 430 may be configured to direct the primary gas flow received from compressed fluid source 32 toward outlet 406 of aspirator 40. Aspirator 40 is configured such that, when inlet flaps 410 are in the closed position (as shown in FIG. 5A), fluid is blocked, and/or generally prevented, from flowing into and/or out inlet 404 of aspirator 40.

In accordance with various embodiments, during inflation of evacuation slide 16, with momentary reference to FIG. 2, the force generated by the flow of primary gas G from conduits 432 may cause inlet flaps 410 to pivot to the open position. Translation of inlet flaps 410 to open position allows ambient air A to flow through inlet 404 and into interior volume 420. The ambient air A may mix with primary gas G from manifold 430. The mixture of ambient air A and primary gas G is provided to evacuation slide 16 through outlet 406.

As the flow velocity of primary gas G decreases (i.e., as compressed fluid source 32 empties) and/or as the internal volume 110 of first inflatable tube 28 fills with fluid, the pressure within in interior volume 420 begins to increase. Inlet flaps 410 are configured to translate to the closed position in response to the pressure within interior volume 420 exceeding a preselected closing pressure.

Aspirator housing 402 may define orifices 452. Orifices 452 may fluidly couple interior volume 420 with a cavity 350 defined by outer circumferential surface 422 of aspirator housing 402 and PRV 300. When inlet flaps 410 are in the closed position, the pressure within interior volume 420 may increase causing fluid to flow through orifices 452 and into cavity 350.

Figure 6A:
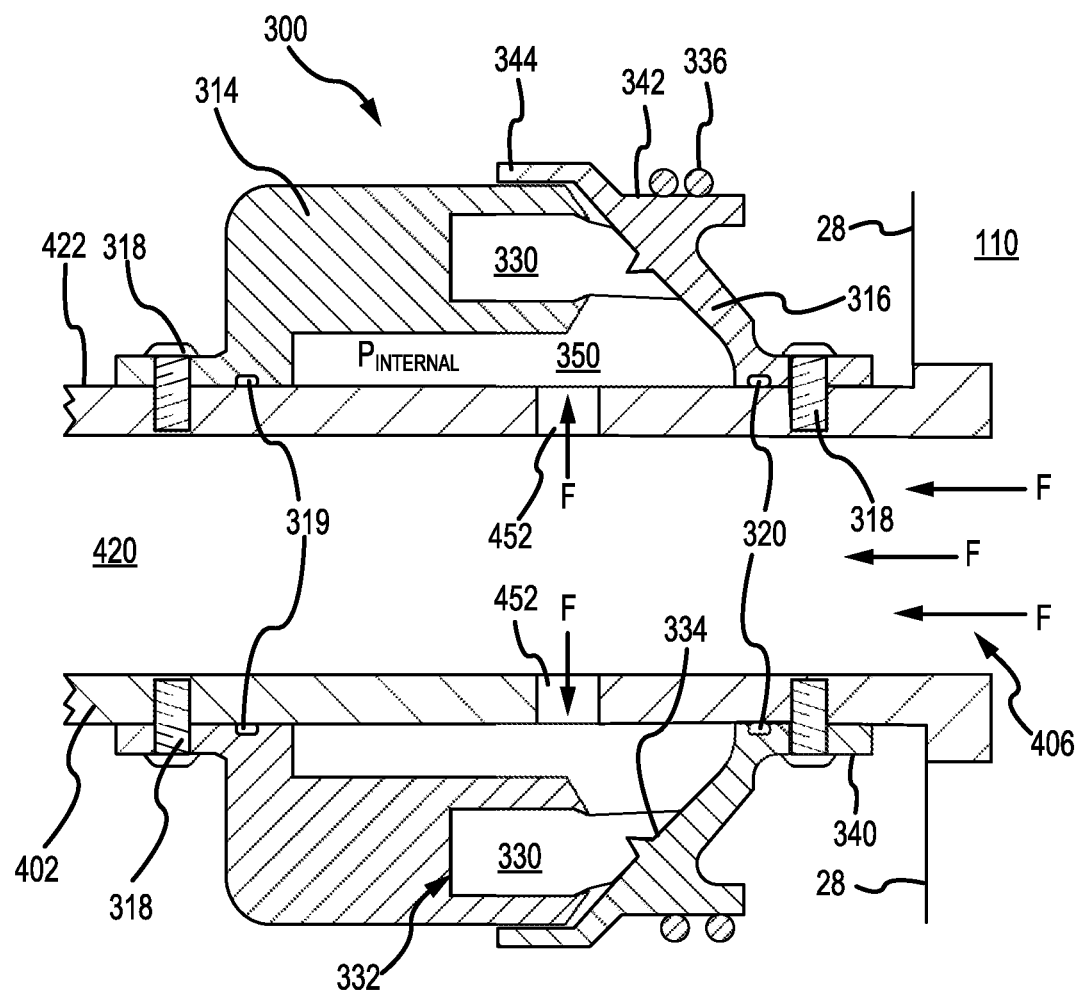
FIGS. 6A and 6B illustrate a cross-section view of a pressure relief valve coupled to an aspirator with a deflecting disk of the pressure relief valve in a closed position and an open position, respectively, in accordance with various embodiments.
Figure 6B:
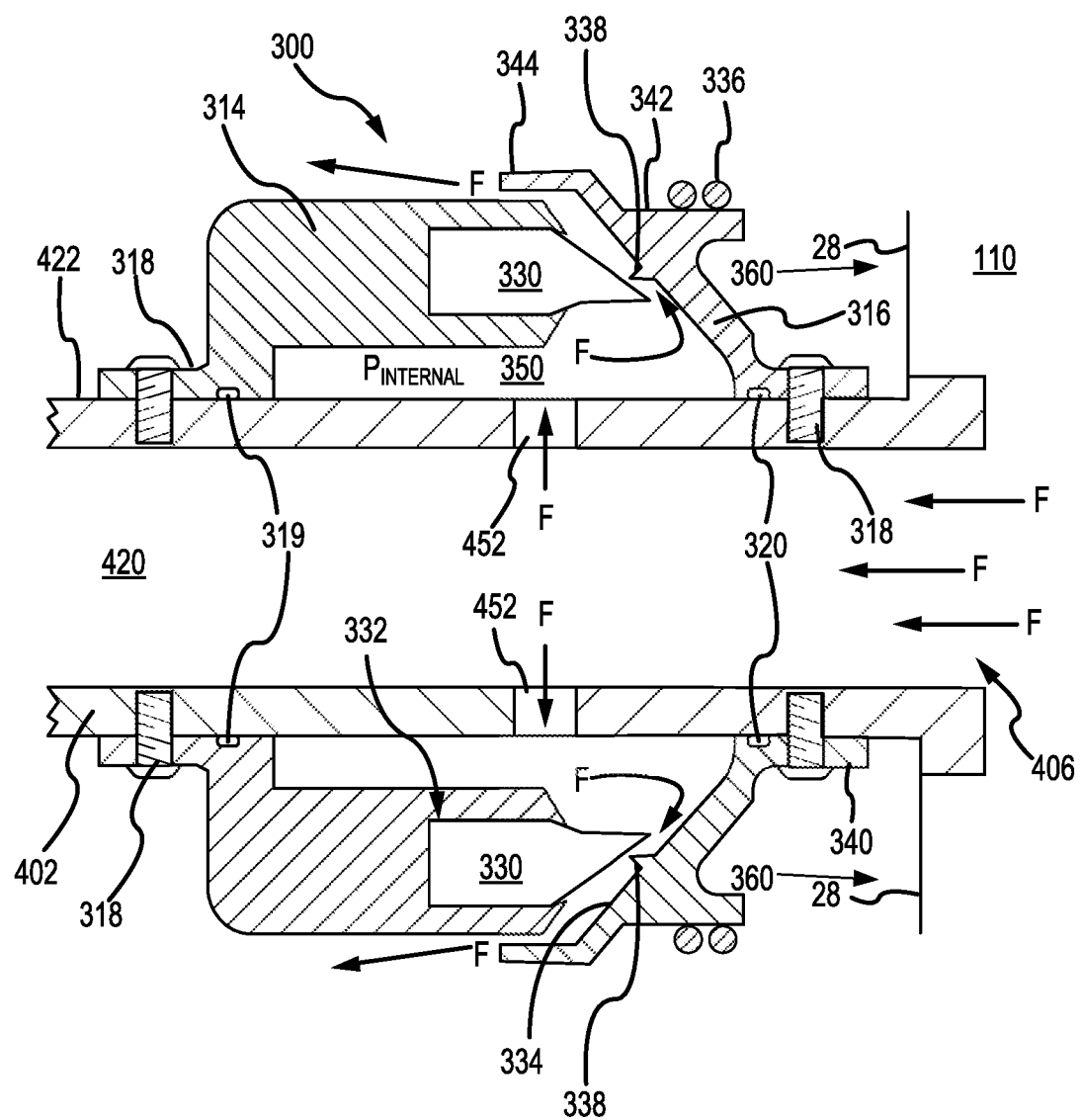

With reference to FIGS. 6A and 6B, cross-section views showing PRV 300 in the closed position and in the open position, respectively, are illustrated. Outlet 406 of aspirator 40 is fluidly coupled first inflatable tube 28 of evacuation slide 16. In various embodiments, outlet 406 may be located in internal volume 110 of first inflatable tube 28. Housing 314 and disk 316 are located external to (i.e., outside of) first inflatable tube 28. In this regard, housing 314 and disk 316 may be located on aspirator housing 402 opposite internal volume 110. While FIGS. 6A and 6B illustrate PRV 300 coupled to aspirator 40, it is contemplated and understood that, in various embodiments, housing 114, disk 116, and seal 130 of PRV 100 in FIG. 3A or housing 214, disk 216, and seal 230 of PRV 200 in FIG. 4 may be coupled to aspirator 40 in place of PRV 300. Similarly, in various embodiments, PRV 300 may be employed with conduit 112 in FIG. 3A or with conduit 212 in FIG. 4.

PRV 300 includes a seal 330. In accordance with various embodiments, seal 330 may be located in a seal cavity 332 defined by housing 314. Seal 330 forms a sealing interface with an interface surface 334 of disk 316. Seal 330 may be formed of a compressible material, for example, rubber, PTFE, fluorosilicone, polyurethane, or any desired elastomer or polymeric material. In various embodiments, interface surface 334 includes a seal seat 338. Seal seat 338 protrudes from interface surface 334 toward seal 330. In the closed position, seal seat 338 may extend into portions of seal 330, thereby increasing the sealing interface formed between seal 330 and interface surface 334.

In various embodiments, PRV 300 includes a biasing member 336. Biasing member 336 is configured to apply a force to disk 316. The force applied by biasing member 336 forces interface surface 334 of disk 316 toward seal 330. Biasing member 336 may comprise a torsion spring, compression spring, or any biasing member. In various embodiments, disk 316 may include a first flange, or collar, 340 located on an outer circumferential surface 422 of aspirator housing 402. First flange 340 is configured to support fasteners 318. In this regard, fasteners 318 secure first flange 340 to aspirator housing 402. In various embodiments, disk 316 may include a second flange, or collar, 342 configured to support biasing member 336. Second flange 342 is generally radially outward of first flange 340. In this regard, a diameter of disk 316 as measure at second flange 342 is greater than a diameter of disk 316 as measure at first flange 340. As used herein, "radial" refers to directions perpendicular to outer circumferential surface 422 of aspirator housing 402. A first component that is radially outward of second component means that the first component is located a greater distance from outer circumferential surface 422 as compared to the second component. In various embodiments, disk 316 may include a third flange, or collar, 344. Third flange 344 may be located directly over housing 314, such that third flange 344 overlaps housing 314 in the radially outward direction. When PRV 300 is in the open position, as shown in FIG. 6B, third flange 344 may direct the flow of fluid exiting PRV 300 away from interface surface 334 and first inflatable tube 28. In various embodiments, a housing O-ring seal 319 may be located between housing 314 and outer circumferential surface 422 of aspirator housing 402. A disk O-ring seal 320 may be located between disk 316 and outer circumferential surface 422 of aspirator housing 402.

In accordance with various embodiments, housing 314, disk 316, seal 330, and outer circumferential surface 422 of aspirator housing 402 define a cavity 350. Cavity 350 receives fluid from interior volume 420 via orifices 452 in aspirator housing 402. In accordance with various embodiments, disk 316 is configured to deflect in the direction of arrow 360 and to an open position (i.e., interface surface 334 translates away from seal 330) in response to an internal pressure ($P_{INTERNAL}$) within cavity 350 exceeding a preselected threshold pressure. In this regard, interface surface 334 translates away from seal 330, in response to the internal pressure ($P_{INTERNAL}$) within cavity 350 exceeding the preselected threshold pressure. In accordance with various embodiments, $P_{INTERNAL}$ correlates to the internal pressure within interior volume 420 of aspirator housing 402 and the internal pressure of evacuation slide 16. An increase in the pressure of evacuation slide 16 increases $P_{INTERNAL}$. In accordance with various embodiments, disk 316 and biasing member 336 are configured such that when $P_{INTERNAL}$ exceeds the preselected threshold pressure, the biasing force applied by biasing member 336 to disk 316 is overcome, thereby allowing disk 316 to deflect away from housing 314 and seal 330 such that a space is created between seal 330 and interface surface 334. In the open position, fluid F may flow between seal 330 and interface surface 334 and out PRV 300, thereby decreasing the internal pressure of evacuation slide 16. With PRV 300 in the open position, $P_{INTERNAL}$ continues to decrease until the force applied by biasing member 336 exceeds $P_{INTERNAL}$. Once the force applied by biasing member 336 exceeds $P_{INTERNAL}$, PRV 300 will translate to closed position, wherein interface surface 334 forms a sealing interface with seal 330. In various embodiments, seal 330 and disk 316 are configured such that when disk 316 is in a neutral (i.e., non-defected) position, interface surface 334 contacts seal 330. In various embodiments, seal 330 and disk 316 are configured such that, when disk 316 is in the neutral (i.e., non-defected) position, interface surface 334 compresses seal 330.

PRV 300 employs deflection of disk 316 to translate between the open and closed positions. Using deflection, as opposed to the sliding movement employed by conventional seals, tends to reduce or eliminate pressure induced noise or chattering. PRV 300 being located external to first inflatable tube 28 (e.g., on aspirator 40) provides easy access to the components of PRV 300 should they need to be repaired or replaced and also reduces or eliminates hard spots within the slide, which tends to allow for easier folding and packing of the evacuation slide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A pressure relief valve, comprising:
   a housing;
   a structure configured to deflect relative to the housing, wherein the structure comprises a tapered portion;
   a seal configured to form a sealing interface between the housing and an interface surface on an interior surface of the tapered portion; and
   a conduit, wherein the housing and the structure are mounted to the conduit, wherein the housing, the structure, the seal, and an outer circumferential surface of the conduit define a cavity, and wherein an orifice defined by the conduit fluidly connects an interior of the conduit and the cavity.

2. The pressure relief valve of claim 1, wherein the structure is configured to deflect away from the housing in response to a pressure within the cavity exceeding a preselected threshold pressure.

3. The pressure relief valve of claim 1, further comprising a biasing member configured to apply a biasing force against an exterior of the tapered portion, wherein the seal is located in a seal cavity defined by the housing, and wherein the biasing member is configured to bias the interface surface on the interior surface of the tapered portion toward the seal.

4. The pressure relief valve of claim 3, wherein the biasing member comprises a torsion spring.

5. The pressure relief valve of claim 4, wherein the interface surface of the interior surface of the tapered portion includes a seal seat, and wherein the seal seat protrudes from the interface surface of the interior surface of the tapered portion toward the seal.

6. The pressure relief valve of claim 1, further comprising a biasing member configured to apply a biasing force against the structure, wherein the seal is coupled to the interface surface on interior surface of the tapered portion, and wherein the biasing member is configured to bias the structure and the seal toward an interface surface of the housing.

7. An evacuation assembly, comprising:
   an inflatable slide;
   an aspirator fluidly coupled to the inflatable slide; and
   a pressure relief valve coupled to at least one of the inflatable slide or the aspirator, the pressure relief valve including:
   a housing;
   a structure configured to deflect relative to the housing, wherein the structure comprises a tapered portion; and
   a seal configured to form a sealing interface between the housing and an interface surface on an interior surface of the tapered portion, wherein the housing, the structure, and the seal define a cavity, and wherein the structure is configured to deflect away from the housing in response to a pressure within the cavity exceeding a preselected threshold pressure.

8. The evacuation assembly of claim 7, wherein the pressure relief valve further comprises a conduit fluidly coupled to the inflatable slide, and wherein the housing and the structure are mounted to the conduit.

9. The evacuation assembly of claim 8, wherein the conduit is configured as a closed conduit.

10. The evacuation assembly of claim 8, further comprising a plug removably coupled to the conduit, wherein an end of the conduit forms an inflation-deflation port in response to removal of the plug.

11. The evacuation assembly of claim 7, further comprising a biasing member configured to bias the structure toward the housing.

12. The evacuation assembly of claim 11, wherein the biasing member comprises a torsion spring.

13. The evacuation assembly of claim 12, wherein the seal is located in a seal cavity defined by the housing, and wherein the biasing member is configured to bias the interface surface on the interior surface of the tapered portion toward the seal.

\* \* \* \* \*